US007988046B2

(12) United States Patent  
Moynihan et al.

(10) Patent No.: US 7,988,046 B2
(45) Date of Patent: *Aug. 2, 2011

(54) VEHICLE VIOLATION ENFORCEMENT SYSTEM AND METHOD

(75) Inventors: Patrick Moynihan, Bedminster, NJ (US); Larry Berman, Delray, FL (US); Cory Marchasin, Lambertville, NJ (US); Josiah Johnson, Somerville, NJ (US)

(73) Assignee: IPT, LLC, Somerville, NJ (US)

( * ) Notice: Subject to any disclaimer, the term of this patent is extended or adjusted under 35 U.S.C. 154(b) by 239 days.

This patent is subject to a terminal disclaimer.

(21) Appl. No.: 12/268,460

(22) Filed: Nov. 11, 2008

(65) Prior Publication Data

US 2010/0123557 A1 May 20, 2010

Related U.S. Application Data

(62) Division of application No. 11/122,953, filed on May 5, 2005, now Pat. No. 7,731,088.

(60) Provisional application No. 60/580,193, filed on Jun. 16, 2004.

(51) Int. Cl.
| | |
|---|---|
| *G07B 15/02* | (2011.01) |
| *G07B 15/00* | (2011.01) |
| *G07B 13/04* | (2006.01) |
| *G06K 7/00* | (2006.01) |
| *G06K 19/06* | (2006.01) |
| *G06K 5/00* | (2006.01) |
| *G06F 17/00* | (2006.01) |
| *G06Q 10/00* | (2006.01) |
| *B60Q 1/48* | (2006.01) |

(52) U.S. Cl. .......... 235/384; 235/435; 235/472.02; 235/380; 235/492; 705/13; 705/417; 705/418; 705/1.1; 340/932.2; 340/933; 70/226

(58) Field of Classification Search .......... 705/1.1, 705/13, 417, 418; 235/435, 472.02, 380, 235/492, 384; 340/932.2, 933, 572.1; 70/226
See application file for complete search history.

(56) References Cited

U.S. PATENT DOCUMENTS 1,489,272 A    4/1924  Murrah
(Continued)

FOREIGN PATENT DOCUMENTS

CA             608990        11/1960
(Continued)

OTHER PUBLICATIONS

International Search Reported for PCT/US06/11725 dated Dec. 20, 2007.
(Continued)

*Primary Examiner* — Daniel Walsh
(74) *Attorney, Agent, or Firm* — Sills Cummis & Gross P.C.

(57) ABSTRACT

A PDA device is used to record the ID of a vehicle boot RFID tag and to transmit to the tag and to a host entity violation data such as summons number, license number, time and date stamp, issuing person ID, location of the vehicle, scofflaw data and so on. This data may be entered into the PDA electronically via a communication network such as the internet or LAN system or manually via a keyboard. The host entity has a data base which is uploaded with this information and has correlation of RFID tag numbers to an unlock combination number for each boot. When the boot is attached to a vehicle this PDA data is transmitted to the host entity whose contact telephone number is attached to the vehicle being booted. The driver contacts the entity to pay the fine and receive in return the unlock combination. The driver thus can release and remove the boot within minutes of returning to the vehicle and can return the boot at his leisure.

17 Claims, 4 Drawing Sheets

U.S. PATENT DOCUMENTS

| | | | | |
|---|---|---|---|---|
| 1,530,622 | A | 3/1925 | Roberts | |
| 2,960,857 | A | 11/1960 | Winter | |
| 3,810,370 | A * | 5/1974 | Jeppesen | 70/225 |
| 3,907,072 | A | 9/1975 | Shafer | |
| 4,509,347 | A | 4/1985 | Young | |
| 4,649,724 | A | 3/1987 | Raine | |
| 4,723,426 | A * | 2/1988 | Beaudoin | 70/14 |
| 4,768,359 | A | 9/1988 | Wade | |
| 4,770,013 | A | 9/1988 | Nakai | |
| 4,881,766 | A | 11/1989 | Schmidt et al. | |
| 5,134,868 | A | 8/1992 | Bethards | |
| 5,263,118 | A * | 11/1993 | Cornelison | 704/200 |
| 5,315,848 | A | 5/1994 | Beyer | |
| 5,372,018 | A | 12/1994 | Smith | |
| 5,385,038 | A | 1/1995 | Walker | |
| 5,412,963 | A | 5/1995 | Carlo et al. | |
| 5,432,508 | A * | 7/1995 | Jackson | 340/932.2 |
| 5,636,537 | A | 6/1997 | Chen | |
| 5,673,574 | A | 10/1997 | Bertram | |
| 5,740,050 | A * | 4/1998 | Ward, II | 705/418 |
| 5,829,285 | A * | 11/1998 | Wilson | 70/226 |
| 5,862,688 | A | 1/1999 | Odegard | |
| 5,905,247 | A * | 5/1999 | Ilen | 235/384 |
| 5,940,481 | A * | 8/1999 | Zeitman | 705/13 |
| 6,032,497 | A | 3/2000 | Fulcher et al. | |
| 6,037,880 | A * | 3/2000 | Manion | 340/932.2 |
| 6,049,269 | A | 4/2000 | Byrd et al. | |
| 6,081,206 | A * | 6/2000 | Kielland | 340/937 |
| 6,241,418 | B1 * | 6/2001 | Suzuki et al. | 404/6 |
| 6,265,973 | B1 | 7/2001 | Brammall et al. | |
| 6,344,806 | B1 * | 2/2002 | Katz | 340/932.2 |
| 6,481,622 | B2 * | 11/2002 | Hjelmvik | 235/384 |
| 6,513,711 | B1 * | 2/2003 | Hjelmvik | 235/385 |
| 6,522,264 | B1 | 2/2003 | Stewart | |
| 6,559,776 | B2 * | 5/2003 | Katz | 340/932.2 |
| 6,693,539 | B2 | 2/2004 | Bowers et al. | |
| 6,714,121 | B1 | 3/2004 | Moore | |
| 6,734,795 | B2 | 5/2004 | Price | |
| 6,736,316 | B2 | 5/2004 | Neumark | |
| 6,738,628 | B1 | 5/2004 | McCall et al. | |
| 6,745,603 | B1 | 6/2004 | Shaw | |
| 6,865,539 | B1 * | 3/2005 | Pugliese, III | 705/5 |
| 7,114,651 | B2 * | 10/2006 | Hjelmvik | 235/384 |
| 7,296,755 | B2 * | 11/2007 | Nakajima | 235/492 |
| 7,346,439 | B2 * | 3/2008 | Bodin | 701/36 |
| 7,731,088 | B2 * | 6/2010 | Moynihan et al. | 235/384 |
| 2002/0008639 | A1 * | 1/2002 | Dee | 340/932.2 |
| 2002/0099574 | A1 * | 7/2002 | Cahill et al. | 705/5 |
| 2002/0109610 | A1 * | 8/2002 | Katz | 340/932.2 |
| 2002/0125998 | A1 * | 9/2002 | Petite et al. | 340/286.01 |
| 2002/0163443 | A1 | 11/2002 | Stewart et al. | |
| 2003/0010821 | A1 * | 1/2003 | Silberberg | 235/382 |
| 2003/0132840 | A1 * | 7/2003 | Bahar | 340/541 |
| 2003/0141363 | A1 * | 7/2003 | Hjelmvik | 235/382 |
| 2003/0206117 | A1 * | 11/2003 | Rosenberg et al. | 340/932.2 |
| 2003/0222792 | A1 | 12/2003 | Berman et al. | |
| 2004/0039632 | A1 * | 2/2004 | Han et al. | 705/13 |
| 2004/0227626 | A1 | 11/2004 | Lafferty | |
| 2004/0254840 | A1 * | 12/2004 | Slemmer et al. | 705/22 |
| 2005/0068196 | A1 * | 3/2005 | Marin | 340/932.2 |
| 2005/0086099 | A1 * | 4/2005 | Hjelmvik | 705/13 |
| 2005/0088320 | A1 * | 4/2005 | Kovach | 340/933 |
| 2005/0270178 | A1 * | 12/2005 | Ioli | 340/932.2 |
| 2005/0279820 | A1 * | 12/2005 | Moynihan et al. | 235/375 |
| 2006/0016230 | A1 * | 1/2006 | Loughlin et al. | 70/366 |
| 2006/0129500 | A1 * | 6/2006 | Mandy et al. | 705/65 |
| 2006/0152349 | A1 * | 7/2006 | Ratnakar | 340/426.1 |
| 2006/0190317 | A1 * | 8/2006 | Crockett | 705/9 |
| 2006/0212344 | A1 * | 9/2006 | Marcus et al. | 705/13 |
| 2006/0227010 | A1 * | 10/2006 | Berstis et al. | 340/932.2 |
| 2006/0255119 | A1 * | 11/2006 | Marchasin et al. | 235/375 |
| 2007/0046484 | A1 * | 3/2007 | Bucholz et al. | 340/686.1 |
| 2007/0112620 | A1 * | 5/2007 | Johnson et al. | 705/13 |
| 2008/0218383 | A1 * | 9/2008 | Franklin et al. | 340/937 |
| 2008/0238719 | A1 * | 10/2008 | Marchasin et al. | 340/901 |
| 2008/0291054 | A1 * | 11/2008 | Groft | 340/932.2 |
| 2010/0123557 | A1 * | 5/2010 | Moynihan et al. | 340/10.4 |

FOREIGN PATENT DOCUMENTS

| | | |
|---|---|---|
| CH | 672617 A | 12/1989 |
| GB | 489155 | 7/1938 |
| GB | 3003281 | 8/2002 |
| GB | 3007353 | 10/2002 |
| GB | 3009101 | 2/2003 |
| JP | 58-076348 | 5/1983 |
| JP | 2002-208043 | 7/2002 |
| JP | 2004-199604 | 7/2004 |
| WO | WO 98/12083 | 3/1998 |

OTHER PUBLICATIONS

International Search Report for PCT/US05/016476 dated Nov. 17, 2005.

* cited by examiner

VEHICLE VIOLATION ENFORCEMENT SYSTEM AND METHOD

CROSS REFERENCE TO RELATED APPLICATIONS

This application claims the benefit of and priority on currently pending U.S. Application. No. 11/122,953 filed May 5, 2005, incorporated by reference herein in its entirety, which claimed the benefit of and priority on now abandoned provisional application Ser. No. 60/580,193 filed Jun. 16, 2004 and incorporated by reference herein in its entirety.

BACKGROUND OF THE INVENTION

This invention relates to a system and method for enforcing vehicular parking violations via vehicle immobilizing boots.

Vehicular parking laws are typically enforced by issuing a summons and placing the summons on the vehicle. The owner of the vehicle reviews the summons on the vehicle, is then required to inquire as to the fine and pays the fine or appears in court to contest the summons. The enforcement of the payment of the fines is haphazard in that in many instances the vehicle owner does not pay the fine and accumulates summons and fines. The fines assessed may be increased substantially for repeat violators who are termed scofflaws, who ignore such summons.

One solution to insure payment of fines is to place a boot on the vehicle wheel. Such a boot is a device which is attached to the vehicle wheel to make operation of the vehicle impossible since the wheel is no longer able to roll on the pavement due to the presence of the boot. Such boots are commonly used and widely available. Such boots are typically cumbersome and heavy. For example, such boots are disclosed in Japanese patent JP 58076348, UK design patents 3008370 and 3007353, and U.S. Pat. Nos. 1,489,272; 1,530,622; 3,907,072; 4,768,359; 5,134,868; 5,315,848; 5,372,018; and 5,673,574, all incorporated by reference herein in their entirety.

Boot systems of the type in use, while unpopular with motorists, have become more accepted. Thus, parking enforcement personnel place the oversize and cumbersome boot on a vehicle wheel, immobilizing the vehicle. The offender returns to the vehicle and can not use the vehicle. The offender is prompted by a sticker on the window to call the appropriate entity, e.g., the police, the court or an administrator in order to learn how to have the boot removed. The offender is prompted during the call to make his way to the police station, court or administrator, without his vehicle, to a payment location. The offender is required to pay the fine for this violation and all other outstanding violations, if any. In this regard, boot systems provide for catching scofflaws who have numerous outstanding parking violations. More specifically, once a boot is attached to a scofflaw's vehicle, the authorities can maintain control of the vehicle until all outstanding violations against the owner or operator of the vehicle are paid. Clearly, the use of the boot wheel lock is inconvenient to the offender who must try to obtain alternative transportation from what ever location he may have parked to the payment center, which could be some distance away and to which center there is no readily available transportation. Once the offender's account is settled, he or she must return to his vehicle seeking further transportation, while in parallel to the offender returning to his vehicle, to await a parking enforcement person to remove the boot. Such a person may or may not arrive at the offending vehicle in a timely manner, frustrating the offender. This process can take hours or even days, using up a portion of the collected fine by the summons issuing agency via the man hours spent in arranging for the removal of the boot and in the time necessary for removing the boot and also leaving a very disgruntled citizen. The present inventors recognize that such a system is not satisfactory. It is costly for both the motorist and the agency responsible for enforcement of the traffic laws. In some cases, the boot is used in lieu of towing on private property to insure payment of parking violation fines. The tow operator may not get to the private parking facility for hours to settle the claim.

The present inventors also recognize that at present there is a commercially available prior art electronic tagging device known as RFID (radio frequency identification). This device is known to be programmable and which transmits information that is programmed, such as a tag identification number unique to each tag or other information as desirable for a given implementation. Generally, an RFID tag includes a radio frequency (RF) transmitter, an RF receiver, an RF modulator, and a memory. The memory retains a digital code manifesting the identification number of the tag that is unique to each tag. The RF modulator extracts the digital code representing the identification number and other information as stored in the memory as a modulated signal which is applied to the RF transmitter. The RF receiver receives interrogation and control signals which manifest a request for the identification number and other information as may be stored in the memory. An interrogator unit transmits an interrogation signal to the tag to retrieve information stored in the tag. The interrogation unit may also transmit information to be stored in the tag and which information can be retrieved by an interrogator. For example, see U.S. Pat. No. 6,265,973 which discloses such a tag system. A similar tag system is shown in FIG. 4 herein.

Of interest also is US Publication No. 2003 0222792 (Ser. No. 10/158,493) which discloses a parking meter monitoring system employing PDAs (personal digital assistant), host computer systems employing computers such as personal computers and data bases, a communication network and RFID transmitting and receiving devices for monitoring the status of parking meters. This publication is incorporated by reference herein in its entirety.

BRIEF SUMMARY OF THE INVENTION

A motor vehicular parking enforcement system according to an embodiment of the present invention comprises a vehicle wheel boot for immobilizing a parking violation vehicle, the boot having a lock encoded with a boot release code for releasing the boot from the wheel. An RFID tag having a unique ID is attached to the boot and which tag includes a memory and a transmitter/receiver communication arrangement for receiving, storing and transmitting first information which may include the tag unique ID. A handheld PDA device is included and includes an RFID reader and transmitter, the device is for entering, receiving, storing and transmitting second information at least to and from the tag including the tag ID and violation data of the parking violation. Also included is a communications system for communicating the second information to an entity host computer system.

In one aspect, the device includes a camera for taking and transmitting a photograph of the violation vehicle to the entity host computer system.

In a further aspect, the system includes a summons issuing governing body data base (SDB) containing scofflaw data and wherein the host computer system includes a link to the communication system for communicating with the SDB to determine the scofflaw status of the violation vehicle and for communicating this status to the entity host computer system.

In a further aspect, the device includes a communication arrangement for communicating with a summons issuing governing body data base (SDB) containing scofflaw data for storing the scofflaw data in the device memory.

In a further aspect, the host system includes a communication link for communicating with the SDB to determine and store the scofflaw status of the violation vehicle in the host system memory.

In a further aspect, the entity host system includes a data base containing the boot release code corresponding to the unique RFID tag and a CPU for corresponding the release code to the boot unique ID for accessing and permitting the communication of the release code to the person associated with the violation vehicle in return for payment of all outstanding fine(s) due from the person.

In a further aspect, the PDA includes a key pad for entering summons data wherein the data entered includes the name and/or related information regarding the person issuing the summons for the violation, the date, the time, the location selected from codes stored in memory, the license number and state of the vehicle registration, the summons number, and a violation code.

In a further aspect, the PDA includes a modem for communicating to the host system summons and RFID tag data to the host system and for communicating to a municipality computer system containing scofflaw data for transferring scofflaw data to the PDA.

In a further aspect, further including a governing body data base of scofflaw data, a card reader/writer associated with the governing body data base for copying scofflaw data to a card associated with the reader/writer, the card for transferring the scofflaw data to the PDA.

In a still further aspect, the PDA includes a card reader for copying scofflaw data into the PDA from a memory card.

In a further aspect, a card reader/writer is attached to a computer associated with the scofflaw data base wherein the scofflaw data is uploaded to a memory card as needed.

In a further aspect, the host system includes a data base with all boot release codes and a CPU for accessing the release code from the host data base for all RFID tags and the corresponding unique RFID codes for which a summons is issued for a parking violation.

in a further aspect, the PDA includes a memory for storing entered current vehicle violation data and RFID read data including the unique RFID code and a communication system for communicating the stored violation data including scofflaw data, the RFID read data and the current violation data to the host system.

In a further aspect, the host system also may include a communication link for communicating to a tow operator the status of the fine payment, the location of the parking violation vehicle and the unlock code for the boot for removal of the boot and towing of the parking violation vehicle by the tow operator.

A method for enforcing parking violations in a further aspect comprises the step of communicating the violation scofflaw status, the location and ID of a vehicle locking boot attached to a vehicle to a host system controlled by an entity representing a summons issuing controlling governing body. The method further includes the step of communicating the identification of the host system controlling entity to the driver of the parking violation vehicle for payment of the associated fine and for communicating the boot release code to the driver upon payment of the fine.

In a further aspect, the method includes the step of requiring the driver to pay a deposit in return for the driver receiving the boot release code and providing for the return of the deposit to the driver upon returning the boot to a boot collection depot or station.

In a further aspect, the method includes providing for the payment of the associated fine to the entity.

A method according to a further aspect includes attaching an RFID tag with a unique code and memory to the boot, the boot having an unlock code; attaching the boot to a vehicle in scofflaw violation of a plurality of parking laws; communicating data manifesting the violation and scofflaw status of the vehicle, the unique code and location of the vehicle to the host system entity; and transmitting information to the person driving the scofflaw violation vehicle to enable the person to contact the entity for payment of the fine associated with the scofflaw violations.

A system for enforcing parking violations in a further aspect comprises a FDA for storing information including parking violation including scofflaw status of a parking violation vehicle, the location and unique ID of a vehicle locking boot attached to and for immobilizing the parking violation vehicle and for communicating this information to an entity host system.

The system also includes a communication system for communicating the identification of the entity to the driver of the parking violation vehicle for payment of the associated fine. The host system includes a computer and data base for storing the boot ID and boot release code for enabling the communication via the communication system of the boot release code to the driver upon payment of the fine.

In a further aspect, the boot includes an RFID tag having memory and a unique ID associated with the boot, the PDA having an RFID tag reader and including a memory and keypad for receiving and storing the scofflaw status of the violation vehicle and for recording the details of the violation data, the boot RFID tag ID and location of the boot.

In a further aspect, the system for enforcing includes a further communication system for permitting the entity and PDA to communicate to a summons issuing governing body data base to determine the scofflaw violation data status of the violation vehicle and for communication to an entity data base the details of the scofflaw violation data, the boot ID and location of the boot.

In a further aspect, the further communicating system is arranged to permit the PDA to communicate with the host system for transferring violation data stored in its memory.

In a further aspect, the PDA and boot include an RFID reader and an RFID tag, respectively.

In a further aspect, an ID medium is included with the identity of the host entity contact information imprinted thereon for attachment to the violation vehicle.

In a further aspect, the host system includes a data base in which the boot RFID unique ID is correlated with a corresponding boot release code.

In a further aspect, the PDA includes a key pad for entering PDA data and wherein the PDA data entered includes the name of the person issuing the summons for the violation, the RFID unique code, the date, the time, the location selected from codes stored in memory, the license number and state of the vehicle registration, the summons number, the violation code, and scofflaw status data.

DETAILED DESCRIPTION OF THE INVENTION

Figure 1:
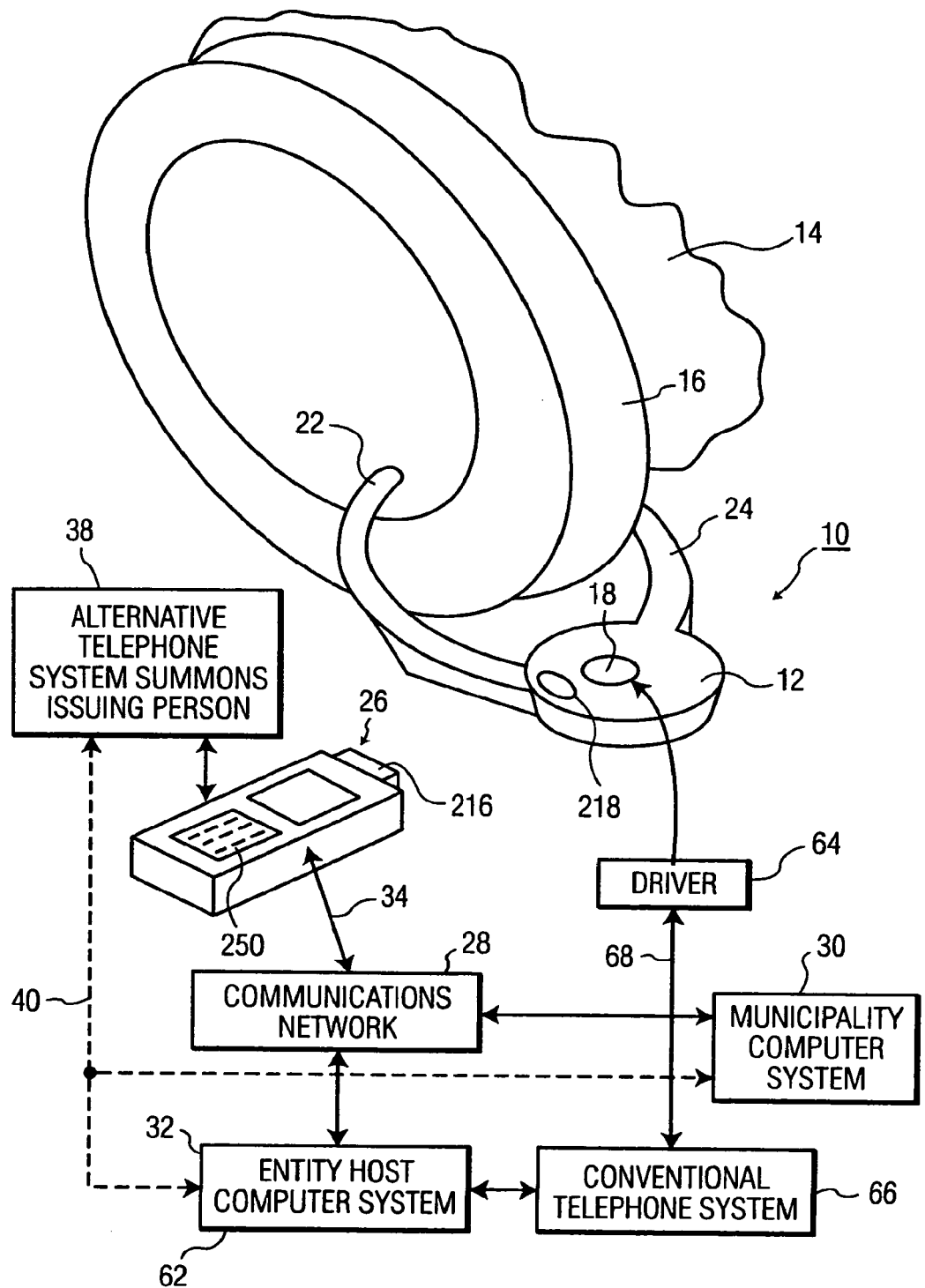
FIG. 1 is a schematic diagram showing a typical boot attached to a vehicle wheel and an embodiment of the system according to the present invention for release of the boot in return for payment of all outstanding fines.

In FIG. 1, violation enforcement system 10 includes a vehicle wheel boot 12 which is attached to a scofflaw's violation vehicle 14 wheel 16. A scofflaw is a person whose vehicle has a number of outstanding summons for parking violations which have been ignored. The number of outstanding violations to achieve scofflaw status may vary for different number of summons issued by summons issuing governing bodies such as for example, a municipality, a city, a university or a corporation. For example, a scofflaw may have two or more outstanding violations.

The boot 12 includes a combination lock 18 which is unlocked by inserting a serial arrangement of a combination of numbers whose serial arrangement is unique for each lock. The boot 12 is unlocked by entering the correct combination of the combination encoded lock 18. Attached to the boot 12 by bonding or any other convenient attachment arrangement is a radio frequency identification tag (RFID) 218. The tag operates at radio frequencies as known in this art and will be described below in greater detail in connection with FIG. 4. The boot 12 is preferably light weight to insure easy portability. The boot 12 has jaws 22, 24 which pivot open and closed about the wheel 16 in response to entering the appropriate combination into the lock 18. Typically the lock 18 is assigned a unique serial number and this serial number is the same as the unique ID code number assigned the tag 218. Each tag 218 of each of a plurality of boots has a unique ID in the tag memory corresponding to the unique serial number of the boot combination lock 18. Thus all boots used by the system 10 are identifiable by their unique RFID code and the preferably identical associated serial number of the corresponding lock 18.

The system includes a personal digital assistant (PDA) 26. The PDA 26 includes an RFID interrogator 216. The interrogator 216 communicates via a communication system internal to or external to the interrogator 216 to a governing body traffic scofflaw data base and to the tag 218 as shown in FIG. 4.

Figure 4:
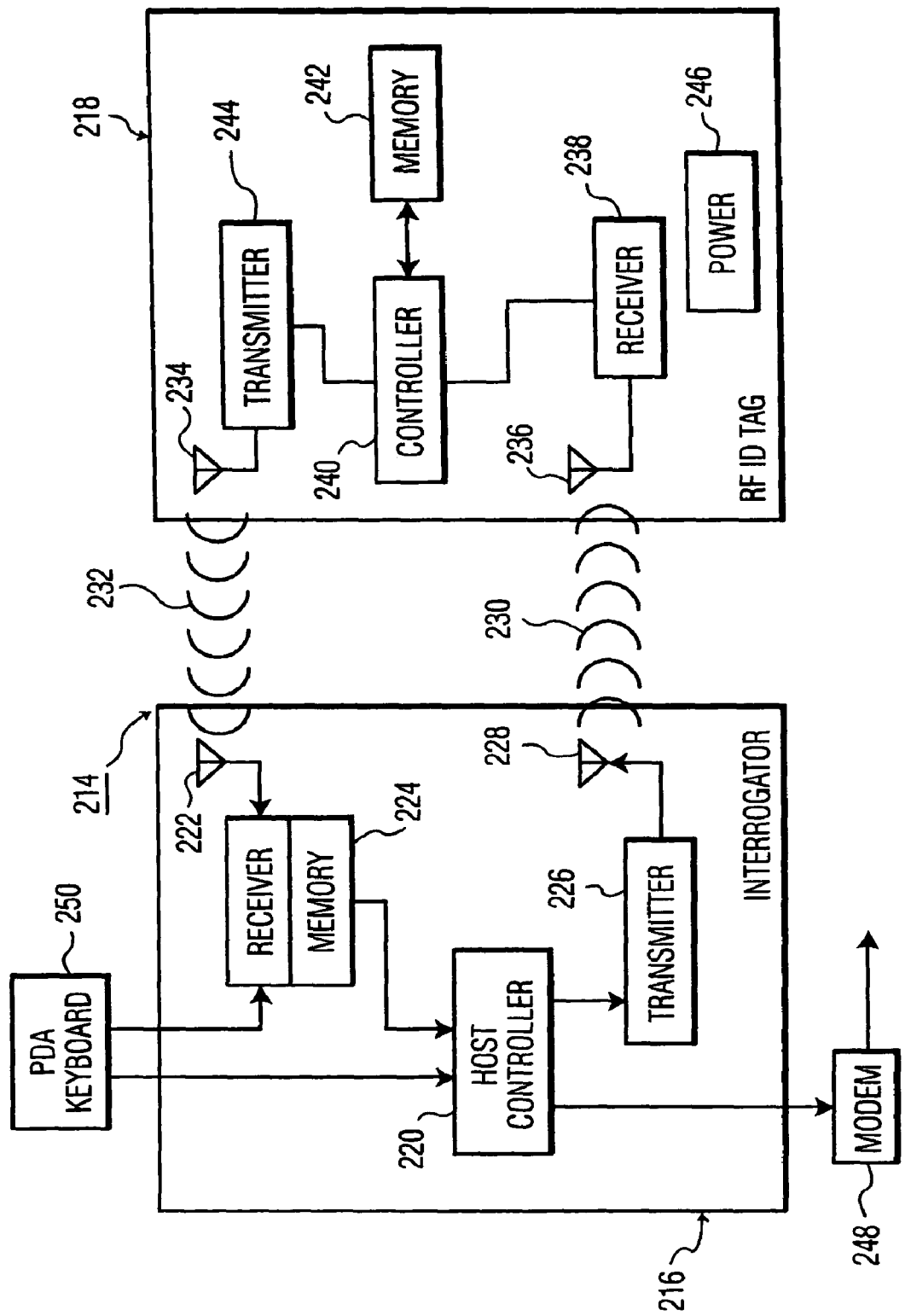
FIG. 4 is a block schematic diagram of an RFID interrogation reader-transmitter and tag system which may be used with the boot of FIG. 1.

In FIG. 4, RFID system 214 includes an interrogator 216 and an RFID tag 218. The interrogator 216 includes a host controller 220 to process received information from the RFID tag 218 via receiver/memory 224 and antenna 222 and from the PDA keyboard 250. A separate memory (not shown) may be included in the host controller for receiving and storing the keyboard inputted data separate from the tag inputted data.

In FIG. 4, The antenna 222 also can receive data via a communication network 28, FIG. 1, from other sources such as from the data base of a municipality traffic violation computer system 30 for receiving scofflaw data. The scofflaw data may also be communicated directly to the host computer system 32 from the municipality computer system 30 via network 28 or from a PDA 26 communication modem 36, FIG. 3, using a communication link to network 28 according to a given implementation. The network 28 may include the Internet, a local area network (LAN) or the intranet among others (not shown). Not all PDA units may have a communication modem 36, FIG. 3, or equivalent communication device.

The summons issuing person may receive and communicate the scofflaw data from the municipal computer system 30 to the PDA 26 via the modem 36 and network 28, to the RFID tag 218 using an RFID interrogator transmitter to be described below and to the host computer system 34 via a telephone system such as a cell phone (not shown).

In FIG. 4, the RFID system includes an interrogator 214 which further includes host controller 220 which generates an interrogation command signal which is transmitted by transmitter 226 and antenna 228 as signal 230. The controller 220 also transmits scofflaw data, and other information in the PDA memory entered by the summons issuing person via antenna 228, the keyboard 250 or a separate antenna as may be needed.

Figure 2:
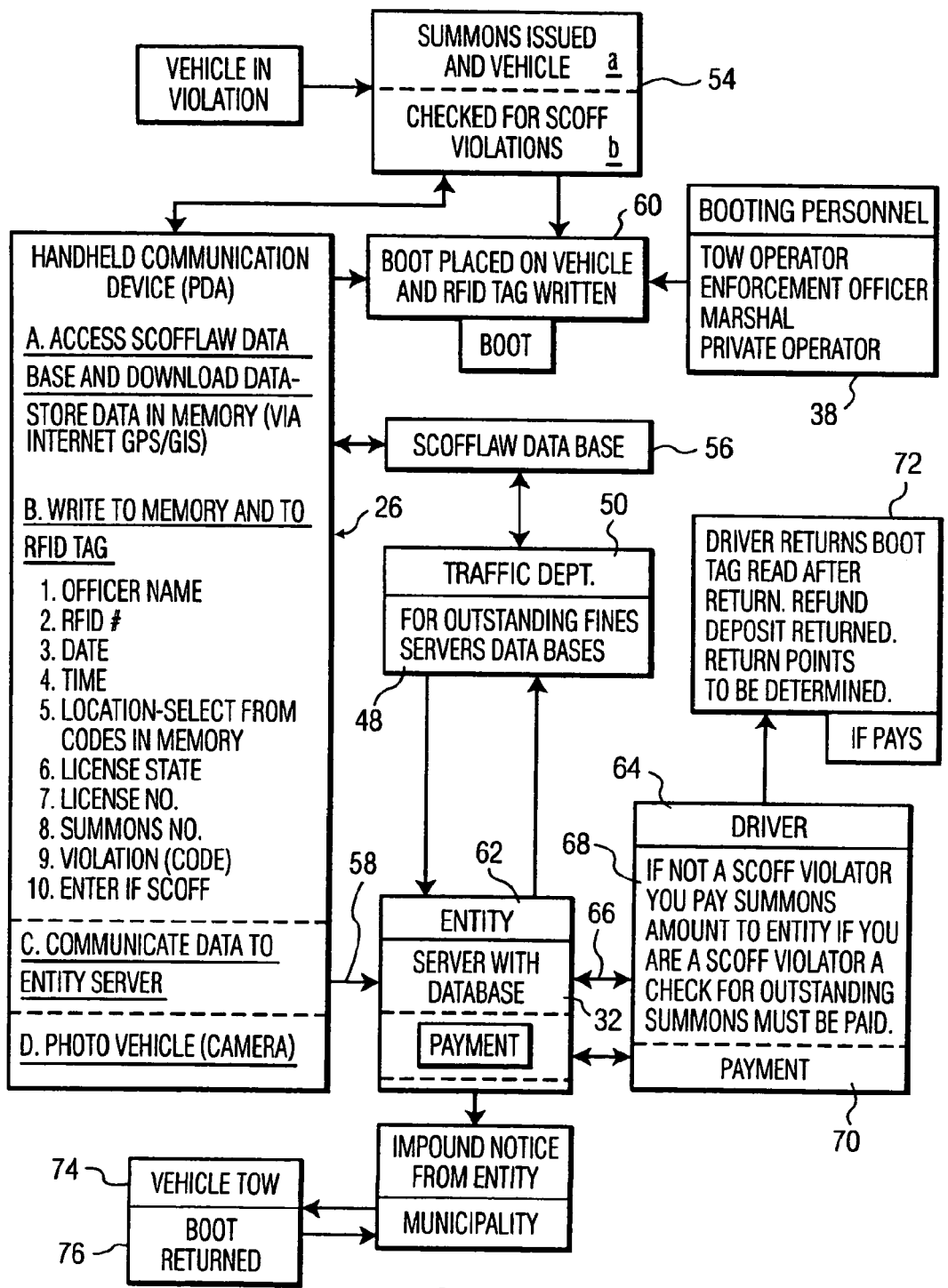
FIG. 2 is a more detailed schematic diagram of the system of claim 1.
Figure 3:
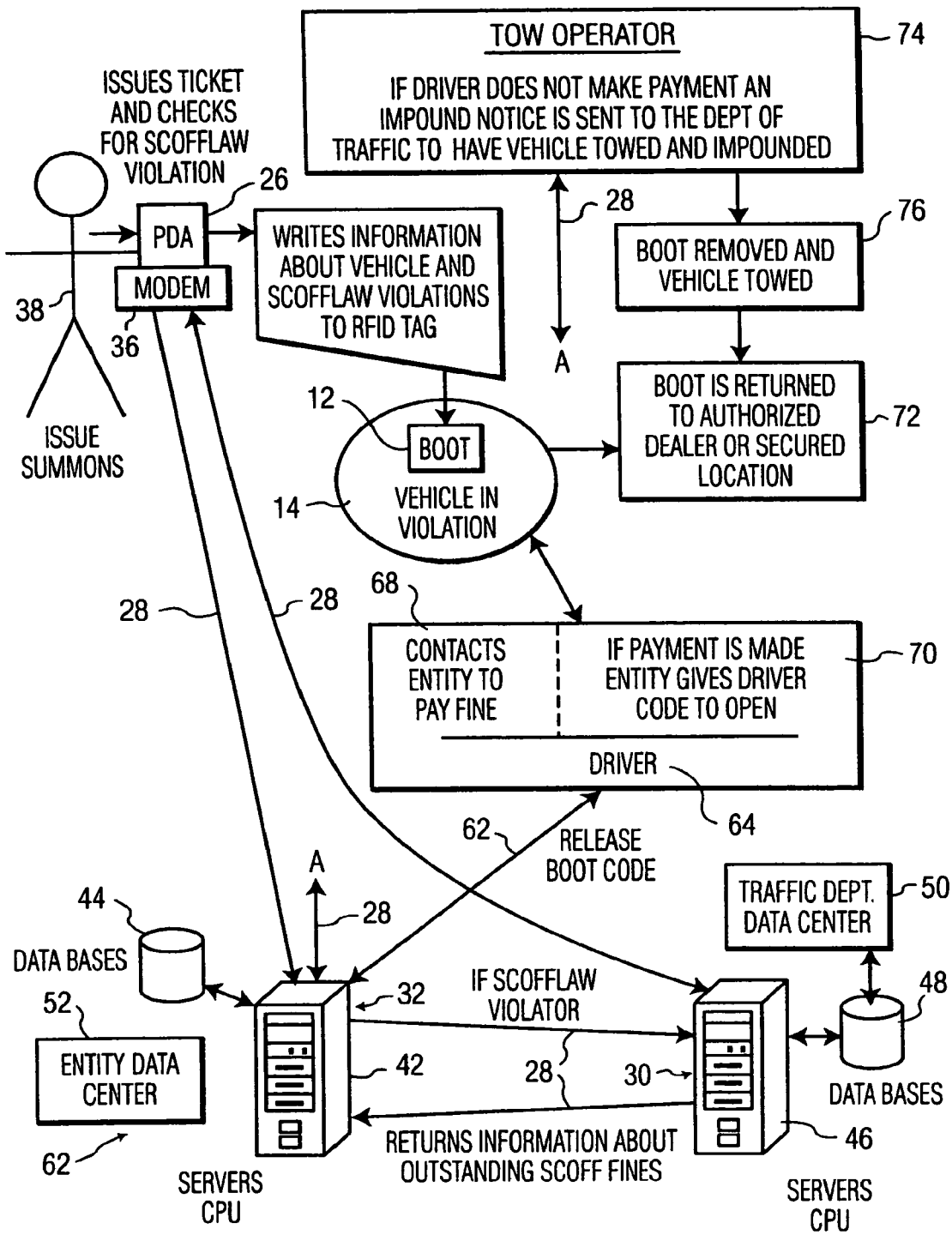
FIG. 3 is a further more detailed schematic diagram of the system of claim 1.

The data entered into the PDA memory via the keyboard 250, FIG. 4, by the summons issuing person 38, FIGS. 1 and 3, includes data shown in FIG. 2 such as the name of the summons issuing person or municipal officer, the RFID unique tag number, the date, time and location of the summons, the location may be selected from memory as stored codes for cities, municipalities and so on, the license number and registration state of the vehicle, the summons number, the violation code and scofflaw indicator which indicates the violator is a scofflaw. The location may also be determined by GPS/GIS system receiver located in the PDA. This data may be entered in part via the keyboard 250 such as the location, which may be entered automatically in the alternative via the GPS if the PDA has such a GPS receiver system installed, license information, officer information (which may be entered by a scanner from an officer ID card in some instances when available) whereas the scofflaw data may be entered automatically for those PDAs that include a modem or communication device for communicating with the network 28, FIG. 1. For those PDAs without a modem or equivalent communication device, communication with the entity host and municipality computer systems may be made manually by cell phone or other telephone or communication device via telephone system 40 and then the various data received from personnel at the host and municipality locations entered manually via the keyboard 250.

In FIG. 4, the RFID tag 218 includes a receiving antenna 236 coupled to a controller 240 via a receiver 238, memory 242 coupled to the controller 240 which extracts appropriate data upon receipt of the signal 230, and a transmitter 244 for transmitting information in the memory 242 via transmitting antenna 234. The interrogator 216 can selectively transmit an interrogation signal and/or first information to the tag which may include violation data such as violation code, summons number, date and time stamp, location, license number and other data entered into the PDA. The tag 218 transmits the RFID signal 232 containing second information in response to receipt of an interrogation signal from the interrogator 216 antenna 228 to antenna 236. This second information includes the tag ID and the pertinent violation data which is transmitted to interrogator 216 via tag 218 antenna 234 to the interrogator antenna 222. The signal 232 manifests the RFID identification number and also violation data that may be stored in the memory 242. Such violation data may be received from the interrogator 216 under the control of controller 220 and stored in the PDA memory (not shown) as previously entered, manually and/or also electronically from scofflaw data downloaded from the host or municipality computer system. This data is transmitted by transmitter 226 under control of controller 220. The keyboard 250 may include keys for controlling the mode of operation of the controller 220 as to issuing an interrogation command signal 230 or first information violation data transmission signal 230 to be stored in the tag 218, as the case may be. The received violation data and the RFID unique number is stored in memory 242 under control of controller 240 and released from memory and transmitted to antenna 234 in response to a control signal received by controller 240 via antenna 236 and signal 230.

To retrieve information from the tag, the host controller 220 generates an interrogation signal 230 upon command from the keyboard 250 or by a signal received thereby and which signal 230 is transmitted by transmitter 226 and antenna 228 as signal 230 to the RFID tag 218 receiving antenna 236.

The RFID tag 218 is affixed to the boot in any convenient location by any suitable attachment arrangement. Such an arrangement may include bonding, fixation in a radio transparent housing which is permanently secured to the boot exterior, secured in an internal boot cavity but exposed in a radiation transparent housing for reception and transmission of radio signals from and to the interrogator and so on. An interrogator may also be located at the host system 32 and/or municipality system 30 for entering or retrieving data from the tag 218.

In FIG. 1, the handheld RFID PDA reader interrogator 216 is used to scan the RFID tag 218. The interrogator 216 logs in its memory the scanned information the unique ID of the tag and the date/time stamp. The remainder of the data required as listed above and as shown in FIG. 2 is entered as described above. The PDA is used, if equipped with a communication modem, to contact the municipality computer system 30 to retrieve scofflaw data which if present, is entered into the PDA memory. The PDA is then used to transmit this information stored in the PDA to the host system 32 data base.

Any commercially known RFID interrogator 216 and tag 218 can be used in the PDA 26 and boot 12 and if necessary, modified as described above. Also, any known PDA can be adapted to include an RFID interrogator 216 such as the TEK protg RFID adapter. Preferably an employee identification card is included for use by the summons issuer for scanning into the PDA his or her employee number.

The PDA 26 using the network 28 uploads the violation data stored in the PDA including the tag ID and so on to the host system 32.

In FIG. 3, the host system 32 includes servers 42 comprising CPUs and memory including data bases 44. The municipality system 30 comprises servers 46 and data bases 48. The municipality system 30 also includes a traffic department data center 50 which has scofflaw data stored therein and which is included in the municipality system 30 data bases 48.

While the host system 32 and the municipality system 30 are described as servers which include high speed hard drives, fast microprocessors and large memories, conventional PCs may be used in the alternative. Such systems also include printers (not shown) for printing out the necessary data.

The host system 32 or the municipality system 30 can operate as set up systems for setting up the PDAs and tags with the appropriate data such as location codes in the PDA, serial nos. and RFID tag numbers for the tags and so on for use in the system 10. The PDAs may also have jacks for attachment to the host system 32 and municipality system 30 for downloading necessary set up information data and implemented with known devices (e.g., file transfer server protocols). The storage devices used in system 10 may be implemented using various data formats as known in this art (e.g., relational databases). The storage memories may be part of the computer systems or implemented with separate devices.

Access to the stored data may be by using Microsoft Access or other suitable databases. The host system and the municipality system servers are located in the same location as the storage devices of the respective systems. Communication therebetween is conventional. The network 28 may be wireless or wired and may be any known system including those noted above. Printers may be at the same locations as the servers or different locations and coupled by known communication systems.

In operation, a summons issuer 38, FIGS. 1 and 3 issues a parking summons to a vehicle in violation of a parking law, step 54a, FIG. 2. The issuer 38 using the PDA communicates via the network 28, FIG. 1 or telephone system 40, with the municipality computer system data bases 48, FIG. 3, to learn if the vehicle has prior outstanding violations, i.e., is a scofflaw, step 54b. This information is automatically downloaded to the PDA via the network 28 or entered manually if by telephone, step 56, FIG. 2.

The municipality computer system 30, a governing body, includes the data base 48, FIG. 3, of scofflaw data. The system 30 also, in an alternative embodiment, includes a memory card reader/writer (riot shown) associated with the data base 48 for copying scofflaw data to a memory card associated with the reader/writer. The card is used to transfer the scofflaw data from the data base 48 to the PDA. Such cards are referred to as compact flash memory card, secure data (SD) card or other terms and are relatively small, but having high memory, e.g., 16, 64, 128 or 256 megabytes memory capacity, commonly used with digital cameras and other electronic systems. Such card readers are widely available. The PDA also has such a card reader (not shown) for transferring scofflaw data entered onto the card from the municipality computer system 30 data base 43, FIG. 3, into its memory.

If the vehicle (via its license plate registration number) has such violations, the issuer 38 then enters the data as shown in FIG. 2 at PDA 26 and described above into the FDA via the keyboard and by the network 28, if available. The issuer then attaches the boot 12 to the vehicle wheel 16, step 60.

The boot 12 RFID tag 218 is previously embedded with a unique ID code number which preferably corresponds to the serial number of the boot 12. At the same time the tag ID and corresponding combination of the boot lock 18 is already in the data base 44 of the host system entity data center 52, FIG. 3. This tag ID is correlated in the host data base 44 with the corresponding combination code to unlock the boot 12 associated with that unique tag ID.

In FIG. 2, the issuer then communicates with the tag to upload the tag ID and then with the host system 32 at step 58. At this time the PDA is used to upload the violation data including the RFID unique code, the date and time of violation, the scofflaw information manifesting if the violator is a scofflaw and to optionally including the total fines attributed to the outstanding violations, optionally also uploaded can be the vehicle make, the vehicle license number, state of registration, the summons number and the violation code via the network 28 or by telephone, if the FDA 26 does not have a modem or communication device for communicating with the network 28. This violation data is also transmitted to the tag 218 via the interrogator 216, FIG. 4., at step 60, FIG. 2.

The summons issuer 38 also places a sticker on the vehicle with information as to how to remove the boot 12, namely, the telephone number of the entity 62 controlling the host computer system 32. The driver 64, FIG. 1, of the violation vehicle then calls the entity 62 via a conventional telephone system 66, FIGS. 1, 2 and 3, step 68.

The entity 62 is given the summons number (which also may be the boot serial number) by the driver 64. Using this information, a person at the entity looks up in its computer system data base the tag ID as communicated to it previously by the summons issuer 38 PDA unit or by telephone from the issuer person. These events may occur within a number of minutes or hours of each other as typically the boot will be attached before the driver returns to the vehicle. Once the entity has the tag ID it also has the associated scofflaw data and fine information. In the alternative, the entity can contact the municipality data base to obtain the fine information, which is more time consuming and not as desirable as having the fine information immediately available. The entity can use its data base to correlate scofflaw data with fine data to determine the fine due for any number of outstanding summons. However, preferably, this data is provided by the PDA as downloaded directly from the municipality system 30, FIG. 1, or as communicated directly to the host system 32 by telephone from the summons issuer.

Having the fine information, the entity person advises the driver what the fine amount is. If the driver accepts at this time to pay the fine, he does this by telephone by giving the entity a credit card number to charge the fine at step 70. The payment also includes a deposit for the boot, for example, $500, to insure the driver returns the boot to the entity. This payment is made at step 70, FIGS. 2 and 3. When the payment charge is approved by the card holder bank or financial institution, the entity then gives the driver the combination code to unlock the boot 12 by telephone and the address of the agency to return the boot. When the boot is returned at step 72 to the entity, or to an agent or dealer and so on, the boot tag is read by the entity, agent or dealer to insure this boot matches the driver data received by telephone. If there is a match, the deposit is returned to the driver. This entire proceeding between the driver and the entity to release the boot from the vehicle is a matter of a few minutes. The driver merely then has to drive to the agency at any time at his convenience to return the boot to obtain the refund of his deposit. This return may be done at the driver's convenience.

If the driver refuses to pay and does not contact the entity, the entity sends an impound notice to the municipality issuing the summons. In the drawings the term "municipality" is intended to represent any controlling governing body that issues summons for parking violations and may include private parties as well as political entities. The municipality then contacts a towing service via telephone, step 74, FIG. 3, for towing the violation vehicle to an impound site. To tow the vehicle, the tow operator needs to remove the boot, step 76. The tow operator communicates with the entity system 32 via telephone to obtain the required combination of the boot lock, step 74. In the alternative, the operator can use a PDA RFID interrogation tag reader to obtain the boot tag ID and related violation data and to communicate this information to either the entity or to the municipality via the network 28 or by telephone to obtain the unlock combination for the boot. The tow operator then removes the boot and tows the vehicle to an impound site, step 76, and the boot is returned, step 72.

The boot release code may be a scrolling number to prevent distribution of boot release codes indiscriminately. That is, the codes may be assigned as random numbers to the boots. When so assigned the numbers are then entered into the appropriate host and municipality data bases wherein control of the boots is initially maintained. If the boots are distributed by the municipality, then it assigns the release codes to each boot, records the release code and boot tag IDs and then transmits such codes to the entity with correspondence to the unique tag IDs associated with each boot. The boots preferably have a master override key to release the boot in case of technological failure of the release code.

While the PDA data is preferably entered manually, the PDA may also have software programming stored therein that enables the PDA to read the scofflaw data base data at the municipality computer system. The PDA has a connector for mating with a receptacle in which such data can be transferred using control circuitry at the municipality computer system 30, FIG. 1. Additionally, the municipality system 30 may also include a system in the alternative for reading scofflaw data directly into the boot tag without a need for the PDA to do so. This direct input of data into the tag memory at the municipality computer system eliminates possible error in the communication system transmission of such data via the PDA to the tag.

It should be understood that the PDA may take many forms of electronic communication systems and may include personal computer systems (PC) such as laptops for example. Such laptops have appropriate software programs including RFID read/write capabilities. Access to the stored data may be made using Microsoft Access, or MsSQL, an open source server query language program based server side database system that is commercially available form Microsoft Corporation and that is widely used, plain text files (.txt) or other database technologies. The plain text file is key for extracting data from multiple sources and for use with a universal readable format.

It will occur to one of ordinary skill that the disclosed embodiments are given by way of example, and that modifications may be made to the disclosed systems. For example, the PDA may include a digital camera whose data may also be communicated by the PDA to the RFID tag and to the entity system 32 and/or to the municipality data base system 30. The disclosed embodiments are given by way of example and not limitation. It is intended that the invention is defined by the appended claims and not by the disclosed embodiments.

What is claimed is:

1. A method for enforcing parking violations comprising the steps of: communicating a violation and a location and ID of a vehicle locking boot attached to a vehicle to a host system controlled by an entity representing a summons issuing controlling governing body, communicating the identification of the host system to a person responsible for the vehicle, receiving payment of an associated fine, communicating a boot release code to the person responsible for the vehicle upon payment of the associated fine and receiving from the person responsible for the vehicle a deposit prior to the boot release code being communicated, receiving the boot from the responsible person and returning the deposit to the person responsible for the vehicle after receiving the boot.

2. The method of claim 1 including providing for the payment of the associated fine to the entity.

3. The method of claim 1 further comprising the steps of: attaching an RFID tag with a unique code and memory to the boot, the boot having an unlock code; and attaching the boot to a vehicle in scofflaw violation of a plurality of parking laws.

4. The method for enforcing parking violations of claim 1 wherein the violation is a parking violation.

5. The method for enforcing parking violations of claim 1 wherein the violation is a scofflaw violation.

6. The method for enforcing parking violations of claim 1 wherein the deposit is a refundable credit card charge.

7. A method for enforcing parking violations comprising the steps of:
   a. communicating a location and identification information of a vehicle to a host system operated by a controlling entity;
   b. receiving instructions from the host system;

c. attaching a locking boot to the vehicle;
d. communicating a fine and contact information of the controlling entity to a person responsible for the vehicle;
e. receiving a payment of the fine from the person responsible for the vehicle; and
f. communicating a boot release code to the person responsible for the vehicle after receipt of the payment, wherein the payment includes a refundable boot deposit charge.

8. The method of claim 7 wherein the steps of communicating a location and identification information of a vehicle and receiving instructions are accomplished utilizing a portable computing device having a communication link to a network which includes the host system.

9. The method of claim 8 wherein the steps of receiving a payment, and communicating a boot release code are accomplished with participation of the person responsible for the vehicle.

10. The method of claim 7 wherein the locking boot includes an RFID tag having a unique code, further comprising the steps of:
a. communicating the unique code to the person responsible for the vehicle.

11. The method of enforcing parking violations of claim 7 wherein the refundable boot deposit charge is refunded after the locking boot is returned to the controlling entity.

12. A method for enforcing parking violations comprising the steps of:
a. communicating a location and identification information of a vehicle to a host system operated by a controlling entity;
b. receiving instructions from the host system;
c. attaching a locking boot having a unique code assigned thereto to the vehicle;
d. communicating unlocking instructions and the unique code to a person responsible for the vehicle, the unlocking locking instructions including a fine;
e. receiving the unique code and a payment of the fine from the person responsible for the vehicle; and
f. communicating a combination code for the locking boot to the person responsible for the vehicle after receipt of a payment of the fine, wherein the payment includes a refundable boot deposit charge.

13. The method of enforcing parking violations of claim 12 wherein the communicating unlocking instructions to the person responsible for the vehicle also includes communicating a time limit prior to which the payment must be received and further including the step of:
a. impounding the vehicle after expiration of the time limit during which payment is not received.

14. The method of enforcing parking violations of claim 12 wherein the refundable boot deposit charge is refunded after the locking boot is returned to the controlling entity.

15. A method for enforcing violations comprising the steps of: maintaining a database containing serial numbers of vehicle locking boots and corresponding boot release codes, the boot release codes being periodically changed and updated in the database so as to prevent improper distribution of the boot release codes, communicating a violation and a location and ID of the vehicle locking boot attached to a vehicle to a host system controlled by an entity representing a summons issuing controlling governing body, communicating the identification of the host system to a person responsible for the vehicle, receiving payment of an associated fine, communicating a boot release code to the person responsible for the vehicle upon payment of the associated fine.

16. The method of claim 15 further comprising the steps of: attaching an RFID tag with a unique code and memory to the boot; and attaching the boot to a vehicle in scofflaw violation of a plurality of parking laws.

17. The method of claim 15 wherein the steps of communicating a location and identification information of a vehicle and receiving instructions are accomplished utilizing a portable computing device having a communication link to a network which includes the host system.

* * * * *